US007606215B2

(12) United States Patent
Poniatowski

(10) Patent No.: US 7,606,215 B2
(45) Date of Patent: Oct. 20, 2009

(54) AUDIO/VISUAL INFORMATION DISSEMINATION SYSTEM

(76) Inventor: Paul Poniatowski, 750 Bay Street, Suite 3005, Toronto, Ontario (CA) M5G 1N6

(*) Notice: Subject to any disclaimer, the term of this patent is extended or adjusted under 35 U.S.C. 154(b) by 867 days.

(21) Appl. No.: 10/407,222

(22) Filed: Apr. 7, 2003

(65) Prior Publication Data

US 2004/0196830 A1 Oct. 7, 2004

(51) Int. Cl.
*H04L 12/66* (2006.01)
*H04M 1/00* (2006.01)

(52) U.S. Cl. ........................ 370/352; 455/566
(58) Field of Classification Search ............... 370/352, 370/329, 338; 455/566
See application file for complete search history.

(56) References Cited

U.S. PATENT DOCUMENTS

| | | | |
|---|---|---|---|
| 5,412,708 A | 5/1995 | Katz | |
| 5,774,534 A | 6/1998 | Mayer | |
| 5,896,129 A | 4/1999 | Murphy | |
| 6,222,826 B1* | 4/2001 | Faynberg et al. | 370/252 |
| 6,869,013 B2* | 3/2005 | Allen et al. | 235/381 |
| 7,149,549 B1* | 12/2006 | Ortiz et al. | 455/566 |
| 2001/0032122 A1* | 10/2001 | Hankla | 705/14 |
| 2001/0032131 A1 | 10/2001 | Mowry | |
| 2002/0022476 A1 | 2/2002 | Go | |
| 2002/0056121 A1* | 5/2002 | Ledbetter | 725/87 |
| 2002/0087335 A1* | 7/2002 | Meyers et al. | 705/1 |
| 2002/0094787 A1* | 7/2002 | Avnet et al. | 455/68 |
| 2002/0130967 A1 | 9/2002 | Sweetser | |
| 2002/0162113 A1 | 10/2002 | Hunter | |
| 2002/0194264 A1* | 12/2002 | Uchiyama et al. | 709/203 |
| 2002/0194622 A1 | 12/2002 | Lord | |
| 2003/0103644 A1* | 6/2003 | Klayh | 382/100 |
| 2004/0103437 A1* | 5/2004 | Allegrezza et al. | 725/95 |

FOREIGN PATENT DOCUMENTS

| | | |
|---|---|---|
| CN | 2179993 | 10/1994 |
| GB | 2 344 009 A | 5/2000 |
| WO | WO 98/11686 | 3/1998 |
| WO | WO 01/27899 A1 | 4/2001 |
| WO | WO 01/33859 | 5/2001 |
| WO | WO 02/084909 | 10/2002 |
| WO | WO 02/093544 A1 | 11/2002 |

* cited by examiner

*Primary Examiner*—William J Deane
(74) *Attorney, Agent, or Firm*—Dowell & Dowell, P.C.

(57) ABSTRACT

Systems and methods for providing information to the public by way of publicly accessible devices. A network of video displays are deployed at publicly accessible locations such as inside public transportation vehicles or at public transportation stations. The video feed to these video displays are provided by a video distribution hub which receives the video feed from a network hub. Different audio feeds are accessible to end users or by telephone. End users can call a telephone interface which receives and routes audio feeds from an audio distribution hub. End users can access audio feeds which may be synchronized with a video feed to provide a complete audio visual experience to the end user. For more useful content, the video displayed at any location may be adjusted to be relevant to the area where the video display is deployed. Audio content synchronized to one of these disparate video feeds can be accessed by the end user by dialing different options through the telephone interface. Audio feeds not tied to a specific video feed, such as radio stations or themed audio feeds, may also be accessed by the end user through the telephone interface.

16 Claims, 2 Drawing Sheets

AUDIO/VISUAL INFORMATION DISSEMINATION SYSTEM

FIELD OF THE INVENTION

The present invention relates to information dissemination systems and is particularly applicable but is not limited to systems and methods for distributing information to the general public at publicly accessible locations.

BACKGROUND OF THE INVENTION

The reason communications revolution has increased the amount of data available to the public. The public's hunger for more and more information has been whetted by this excess of information.

Current systems for information dissemination, especially for disseminating to the members of the public who take public means of transportation, are currently inadequate. These systems are solely visual and static. Sandwich boards, billboards, and other very old static forms of advertising are used for such ends. However, as noted above, these systems are inadequate. Such static forms are purely visual and cannot be readily changed in response to changed conditions. Unfortunately, the ubiquity of televisions and computers have had a deleterious effect on the attention span of the average person. As such, current static systems are unable to keep people's attention.

Another major drawback of current systems is the lack of an audio component. Again, the proliferation of multi-media devices and the ubiquity of multi-media in today's society has the public clamouring for the same presentation type in almost all of their information input. While there are some information dissemination systems that integrate an audio portion (such as publicly accessible television sets), these can be intrusive and annoying to those who do not wish to take advantage of the system.

There is therefore a need for an information dissemination system that integrates both video and audio components while simultaneously avoiding becoming an annoyance to those not wishing to access the information being disseminated. Such an information dissemination system should also be dynamic in that modifying the information content should be relatively simple. Furthermore, the system should be able to keep end users (i.e. the public, especially those who are travelling in public transportation vehicles) occupied and should be able to hold their attention. Finally, it is also very desirable if such a system would be cost effective and financially self sustaining. It is therefore an object of the present invention to mitigate if not overcome the deficiencies of the prior art.

SUMMARY OF THE INVENTION

The present invention relates to systems and methods for providing information to the public by way of publicly accessible devices. A network of video displays are deployed at publicly accessible locations such as inside public transportation vehicles or at public transportation stations. The video feed to these video displays are provided by a video distribution hub which receives the video feed from a network hub. Different audio feeds are accessible to end users or by telephone. End users can call a telephone interface which receives and routes audio feeds from an audio distribution hub. End users can access audio feeds which may be synchronized with a video feed to provide a complete audio visual experience to the end user. For more useful content, the video displayed at any location may be adjusted to be relevant to the area where the video display is deployed. Audio content synchronized to one of these disparate video feeds can be accessed by the end user by dialing different options through the telephone interface. Audio feeds not tied to a specific video feed, such as radio stations or themed audio feeds, may also be accessed by the end user through the telephone interface.

In a first aspect, the present invention provides a system for distributing information to the public, said information comprising at least one video feed and a plurality of audio feeds, the system comprising:

a network hub for receiving said information from a source;

a plurality of publicly viewable video display screens;

at least one video distribution hub, the or each video distribution hub receiving one video feed from said network hub and transmitting said one video feed to at least one of said display screens;

at least one audio distribution hub, the or each audio distribution hub receiving said plurality of audio feeds from said network hub, each of said audio feeds being accessible by end users;

a telephone interface for receiving end user telephone call for accessing said plurality of audio feeds said telephone interface communicating with said at least one audio distribution hub, said telephone interface automatically routing audio feeds from said at least one audio distribution hub to said end user telephone calls based on end user input, wherein at least one audio feed is synchronized with one of the at least one video feed.

In a second aspect, the present invention provides a system for providing at least one audio feed to end users, the system comprising:

a network hub for receiving at least one audio feed;

at least one audio distribution hub receiving said at least one audio feed from said network hub:

a telephone interface for receiving telephone calls from said end users, said interface communicating with said at least one audio distribution hub and said telephone interface automatically routing said at least one audio feed to said telephone calls based on input from said end users.

BRIEF DESCRIPTION OF THE DRAWINGS

A better understanding of the invention will be obtained by considering the detailed description below, with reference to the following drawings in which.

DETAILED DESCRIPTION

Figure 1:
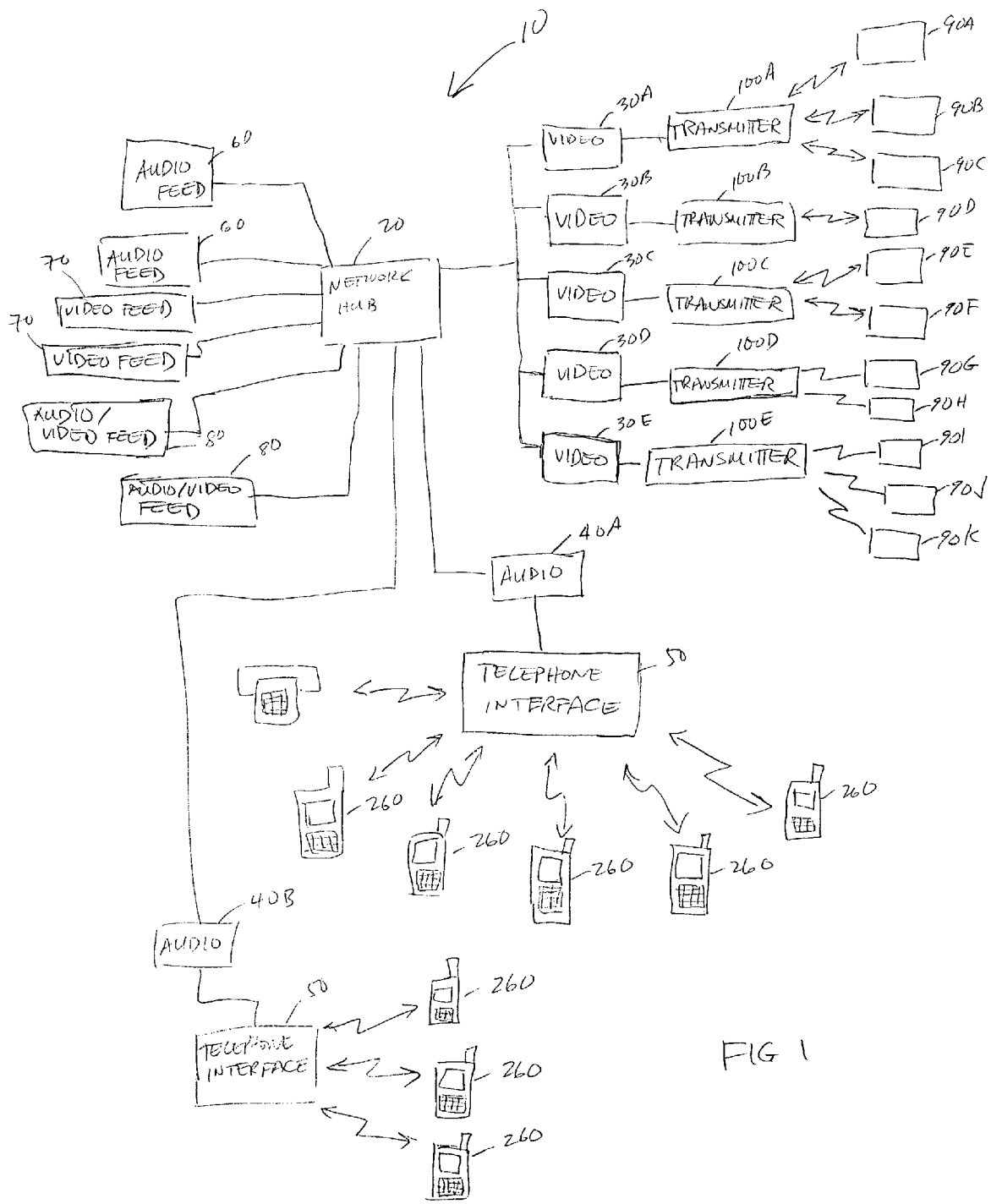
FIG. 1 is a block diagram of a system for distributing information according to one aspect of the invention.

Referring to FIG. 1, a block diagram of a system for distributing information is illustrated. The system has 10 has a network hub 20, multiple video distribution hubs 30A-30E, audio distribution hubs 40A, 40B, and at least one telephone interface 50. The network hub receives multiple audio feeds 60, video feeds 70, and hub end combined audio/video feeds 80 from a variety of sources. These feeds are then separated into dedicated audio only and video-only feeds. The dedicated audio-only feeds are sent to the audio distribution hubs 40A, 40B while the dedicated video-only feeds are sent to the video distribution hubs 30A-30E. At the video distribution hubs, the relevant video only feeds are transmitted to multiple video display screens 90A-90K by transmitters 100A-100E. On the audio side, the telephone interface 50 receives the dedicated audio only feed and routes this to the telephone interface 50. The telephone interface 50 receives telephone calls from end users who wish to access one of the audio feeds. The end users, who could be calling and using their mobile or cellular telephones, can select one of the available audio feeds. Based on the end user input, the interface 50 selects the relevant audio feed and routes this feed to the relevant end user.

The network hub 20 can be seen as an audio/video feed aggregator—it receives feeds from a variety of sources and collects and combines these feeds into two signals, a dedicated audio feed and a dedicated video feed. The sources from which the feeds originate may be legion—the feeds could come from the Internet, a cable TV provider, broadcast TV, broadcast radio, a dedicated video or audio signal specifically created for the system, or any other source. The network hub 20 separates the feeds depending on the content—video feeds are separated and routed differently from audio feeds using well-known methods and techniques. Video feeds are aggregated into a first single signal with different video feeds occupying different parts or frequencies of that first single signal. Audio feeds are aggregated into a second single signal with different audio feeds occupying different parts or frequencies of that second single signal. The video feed signal (the first single signal) is then transmitted to the video distribution hubs 30A-30E. The audio feed signal (the second single signal) is transmitted to the audio distribution hubs 40A, 40B.

Regarding the video distribution hubs 30A-30E, each one can "tune" into or isolate one of the video fees aggregated into the video feed signal from the network hub 20. The video feed that a distribution hub tunes into is then passed to a corresponding transmitter. A transmitter then transmits the video feed to multiple video display screens. Each video distribution hub 30A-30E can be a video tuner which tunes to a specific video feed in the video feed signal. Such tuners are well-known in the art.

The transmitters 100A-100E may be, depending on the implementation, wireless, wired, or optical transmitters. The transmitters 100A-100E transmit the isolated or tuned into video feed to the different video display screens. Each video transmission hub and transmitter combination services video display screens located at a specific geographic area. Thus, one geographic area may have display screens 90A, 90B, 90C, showing video feed A as tuned to by video transmission hub 30A while another geographic area may have display screens 90G, 90H showing video feed B as tuned to by video transmission hub 30D. Such an arrangement allows area—or region—centric video feeds to be distributed to the proper areas. Such an arrangement also allows the system to quickly change what is being shown in the video display screen in a specific area. As an example, if an important bulletin alert occurs and is in a video Q, all of the video distribution hubs 30A-30E could automatically switch to video feed Q, ensuring quick dissemination of the bulletin alert to the video display screens serviced by video transmission hubs 30A-30E. Similarly, if the video feed to be sent to a specific geographic area is to be changed, then only the transmission hub which services that specific geographic area needs to have any changes made. That transmission hub may merely need to tune into a different video feed.

Figure 2:
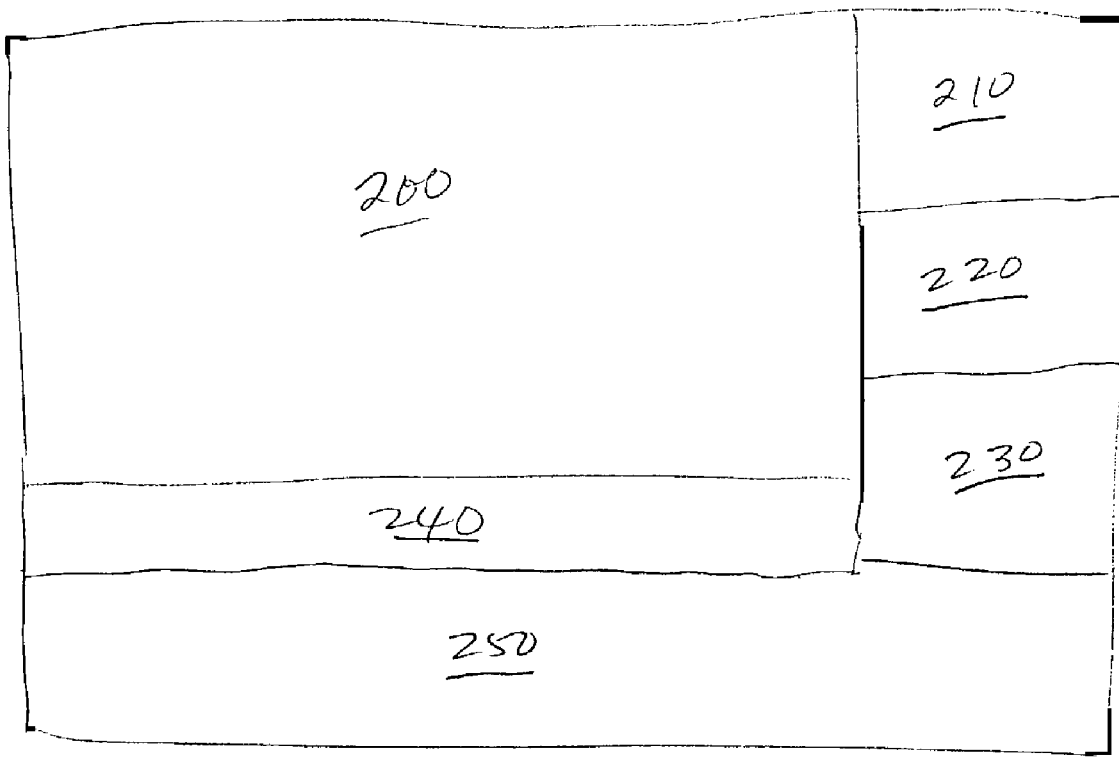
FIG. 2 is a block diagram of an example setup for a video display screen for use with the system of FIG. 1.

It should be noted that, to assist the viewing public in determining the content of the video feed being shown on the display screens, each video feed can be provided with closed captioning. This way, viewers can read the text of the audio for the video feed. It should further be noted that advertising and other relevant data may be inserted into each of the video feeds. This may be done by dividing the visual representation of the video feed into separate areas, with each area being provided with different data. As an example, FIG. 2 illustrates one possible configuration of the visual representation. Area 200 may have the actual moving video being presented (such as a newscast, a situation comedy, or a soap opera program). Area 210 may present the weather forecast for the city, area 220 may present a stock market report and area 230 may present sports scores. Area 240 may be reserved for the closed captioning for the video in area 200 and area 250 may be provided for advertisements that are targeted to the end users. As noted above, the video portions of the presentation (presented in area 200) may be different for different areas. Similarly, different advertisements may be presented for different geographic areas. Ideally, up to ¾ of the display screen may be devoted to advertising space. Devoting such a high proportion of the screen to revenue generating advertising should produce enough revenue for the operation of the system.

Regarding the video display screens 90A-90K, these display screens are ideally deployed at publicly viewable areas. These may be deployed inside public transportation vehicles such as subway cars and buses and they may be deployed as static installations in subway/bus stations, busy street corners, and other areas of populace concentration. Plasma display screens may be used as the display screens and, in one embodiment, such screens may be hardened and configured to withstand the elements for an outside deployment. Such a deployment may be placed outside moving vehicles such as buses, thereby providing information dissemination to not only commuters inside the vehicle but commuters outside the vehicle as well. For such mobile deployments, wireless technology may be used to transmit the video feed to the video display screens. For static deployments, wired technology such as cable, optical, and other well-known technologies, may be used for the transmission of the video feed to the video display screens. Other static deployments such as inside public transportation vehicles may use flat computer monitors to minimize deployment costs.

To further lower deployment costs, manufacturers of the display screens could offer preferential pricing for their screens to those deploying and operating the system. Such a measure would provide the manufacturers free advertising as the public would be exposed to their product for free.

The audio portion of the system 10 operates in a similar manner with one important difference—end users can select which audio feed to access. As noted above, the audio feed signal is received by the audio transmission hubs 40A, 40B. The different audio feeds can be accessed by tuning into or isolating the relevant audio feed from the rest of the audio feed signal. This is what the telephone interface 50 does, along with automatically receiving end user telephone calls and automatically routing the relevant audio feed to the relevant end user telephone call. The telephone interface 50 has multiple tuners with each tuner isolating or tuning into one of the audio feeds in the audio feed signal. Upon a request by an end user who is calling in, the relevant audio feed is diverted or routed to this end user.

The telephone interface 50 acts as an access point for end users. End users can call into the telephone interface (with the relevant telephone number perhaps flashed on the video display screens) and access a specific audio feed. To present a complete audio visual experience in conjunction with that with what is being presented on the video display screens, at least one of the audio feeds could be synchronized with the presentation on the video display screens. As an example, if geographic area A is showing video show A1 on screens 90A-90C and geographic area B is showing video show A2 on screens 901-90K, end users in area A would need to access the audio feed synchronized the video show A1 while end users in the area B would need to access the audio feed synchronized to the video show A2. This may be done by an end user calling the telephone interface 50 and, after navigating an automated answering and menu system, accessing the relevant audio feed. This answering and menu system is well-known technology and is readily available. Thus, an end user in area A would, to get the proper audio visual experience, access a different audio feed from that accessed by an end user in area B. As yet another variant, the audio feed synchronized to a specific video show could be presented in different languages as separate audio feeds. As an example, video show A1 showing on screens 90A-90C could be synchronized to three different audio feeds—one audio feed being in English, another audio feed being in French, and a third audio feed being in Chinese. As such, an end user could access anyone of the video feeds synchronized to that specific video show in the language of preference for the end user. Thus, a single video feed being presented in a specific geographic area could be accessible to people who do not necessarily speak the exact same language. Similarly, the closed captioning presented on the video display screens could be presented in multiple languages or, if one language is predominant in a specific area, the closed captioning could be presented in that single language. The technology for routing audio feeds synchronized to a video feed is currently available and used in passenger aircraft that provides in-flight entertainment. Adapting such technology with appropriate telephone menu technology will produce the requisite telephone interface described above.

It should be noted that the audio feeds available need not all be synchronized to the video feeds. Other audio feeds, such as audio feeds that provide music, commentary, radio station feeds, and others, may be available, depending on the implementation. This system is ideally suited to be accessed by commuters with cellular or mobile phones 260. Commuters, while on their morning or afternoon commute may view the video display screens inside the public transportation vehicle or in the stations while waiting for the vehicles. In concert with this, the commuters can use their mobile telephones to call the telephone interface and listen in on the audio portion of the program being presented in area 200 of the video display screen. Alternatively, the commuter may decide not to view the video program on the video display screen but merely listen to some other audio program being presented as a separate audio feed through his or her mobile telephone. However, the system need not be limited to mobile telephones. End users who have, ideally, a landline speaker phone may also access the telephone interface to listen to the different available audio feeds at work or at home. To address the different tastes of different types of people, themed audio feeds, such as all-sports, all-classical music, all-news or all-music (with different audio feeds for different types of music) may also be available.

To accommodate the different regions in a large geographic area, multiple telephone interface/audio transmission hubs may be implemented, with different telephone interfaces serving different areas.

To allow for a financially self-sustaining system, advertising space may be sold on either the video feeds (as explained above) or in the audio feeds. Advertisements may be sold on a per display screen basis, a regional coverage basis, or on a visibility (time visible on screen) basis. Similarly, subscription fees may be collected from end users who wish to access the audio feed. Alternatively, the system could be free to mobile telephone users with the operational and deployment costs being borne by advertisers and/or public transportation bodies.

The system described above is flexible enough for many different types of advertising and promotions. As an example, advertisers could include in their advertising a specific telephone code which users may enter while listening to an audio feed. Entering the code would then automatically connect the end user to the advertiser's telephone call-in center so the end user can then take advantage of the offer (e.g. a vacation trip for a low promotional price). Alternatively, end users may establish an account, with their credit cards on file, with the operators of the system. These end users may then do their shopping over the telephone based on what is being advertised on the display screens. End user choices, such as the colour, size, or type of merchandise, could be entered by the end user via the telephone keypad. Tho verify an end user's identity, PIN (personal identification numbers) could be associated with each end user account. Such PIN numbers would be required to validate/finalize the transaction before the end user's credit card is charged and before the item is shipped to the end user's on-file address.

The system also offers a myriad of advantages to society and the public in general. It may be used as part of a public broadcasting system to inform the populace of alerts or emergencies. It can also increase literacy as those without mobile phones will need to read the closed captioning and/or the text on-screen to determine what is being presented. It will also produce greater usage of public transportation vehicles as passengers are not only transported from one place to another but are also entertained. Such an increase in ridership may also augur an decrease in the number of vehicles on the road, thereby leading to a more environment-friendly society. The increased advertising may also lead to greater consumer spending, thereby fueling economic growth for the areas where the system is deployed.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

I claim:

1. A system for distributing information to the public, wherein the information includes at least one video feed and a plurality of audio feeds, the system comprising:
   a network hub for receiving audio and video information from a source to be distributed to the public;
   a plurality of publicly viewable video display screens;
   at least one video distribution hub, each video distribution hub receiving at least one video feed from said network hub and including transmitter means for transmitting said at least one video feed that is displayed to the public to at least one of said display screens, and the at least one video feed including at least one code for prompting a viewer to use a telephone to access audio information;
   at least one audio distribution hub, each audio distribution hub receiving a plurality of audio feeds from said network hub, each of said audio feeds being accessible by end users by way of a code entered into end users' telephones after the code is visually displayed on said at least one of said display screens and at least one of the audio feeds relates to the at least one video feed that is being displayed to the public;

a telephone interface including means for receiving an end user telephone call for accessing said plurality of audio feeds and such that an end user inputs the code for selection of at least one audio feed from the plurality of audio fees, said telephone interface communicating with said at least one audio distribution hub, said telephone interface automatically routing a selected audio feed from said at least one audio distribution hub to said end user's telephone based on the end user's input, and at least one of the plurality of audio feeds is synchronized with the at least one video feed that is being displayed to the public.

2. A system according to claim 1 wherein said network hub receives the information from the source as separate video and audio feeds.

3. A system according to claim 1 wherein at least one audio feed received by said network hub is a thermal audio feed.

4. A system according to claim 1 wherein at least one of said plurality of publicly viewable display screens receives a video feed from said video distribution hub by wireless means.

5. A system according to claim 1 wherein at least one of said plurality of publicly viewable display screens receives a video feed from said video distribution hub through a closed circuit network.

6. A system according to claim 4 wherein said at least one of said plurality of publicly viewable display screens is deployed on an outside of a vehicle.

7. A system according to claim 4 wherein said at least one of said plurality of publicly viewable video display screen is deployed on an inside of a vehicle.

8. A system according to claim 1 wherein said network hub receives multiple video feeds, each of said multiple video feeds being transmitted to said video display screens located in different geographic regions.

9. A system according to claim 1 wherein said at least one video feed is provided with closed circuit captioning.

10. A system according to claim 1 wherein said at least one video feed is provided with advertisements.

11. A system for providing at least one audio feed to end users based at least in part on a video feed being displayed to the public, the system comprising:

a network hub for receiving a plurality of audio feeds, wherein at least one of said plurality of audio feeds is synchronized with a video feed also being received by the network hub;

a video distribution hub for receiving video feed from the network hub and for transmitting the video feed to at least one publicly viewable display screen so that the video feed is displayed publicly;

at least one audio distribution hub receiving said at least one audio feed from said network hub; and a telephone interface for receiving telephone calls from end users viewing the at least one publicly viewable display screen and calling at least one telephone number shown on the video feed being displayed on that at least one publicly viewable display screen, said telephone interface having means for selection of at least one audio feed from said plurality of audio feeds based upon input from end users calling into the telephone interface, said telephone interface communicating with said at least one audio distribution hub and said telephone interface automatically routing said at least one audio feed to end users based on input from the end users.

12. A system according to claim 11 wherein the video and audio feeds received by said network hub include advertisements from a source, and said telephone interface includes means for entering a promotional code related to video advertising being publicly displayed on the at least one display screen, wherein entering the promotional code causes end users to be directed to a call center where the end users may make a purchase.

13. A system according to claim 11 wherein the audio and video feeds being received by said network hub include information about one or more items of merchandise for sale, and and said telephone interface includes means to enter commands to purchase at least one of the one or more items of merchandise.

14. The system of claim 13, wherein the end users have user accounts associated with said telephone interface to purchase the merchandise.

15. The system of claim 14 wherein each user account is adapted to store credit card information, an end user address, and a personal identification number.

16. The system of claim 13, wherein the end users specify a personal identification number to authorize the purchase of the merchandise.

* * * * *